(12) United States Patent
DeRome et al.

(10) Patent No.: US 7,843,167 B2
(45) Date of Patent: Nov. 30, 2010

(54) BATTERY CHARGER WITH CHARGE INDICATOR

(75) Inventors: Raymond D. DeRome, Twin Lakes, IL (US); Martin M. Rayner, Bristol, WI (US)

(73) Assignee: Snap-on Incorporated, Inc., Kenosha, WI (US)

( * ) Notice: Subject to any disclaimer, the term of this patent is extended or adjusted under 35 U.S.C. 154(b) by 496 days.

(21) Appl. No.: 11/625,719

(22) Filed: Jan. 22, 2007

(65) Prior Publication Data

US 2008/0174269 A1 Jul. 24, 2008

(51) Int. Cl.
*H02J 7/00* (2006.01)
(52) U.S. Cl. .................. 320/112; 320/107; 320/114
(58) Field of Classification Search ............ 320/107, 320/110, 111, 112, 114, 162, 106, 113, 115, 320/150, 152; 307/150; 324/450; 429/62, 429/92, 123, 155
See application file for complete search history.

(56) References Cited

U.S. PATENT DOCUMENTS

| | | | |
|---|---|---|---|
| 3,105,183 A | 9/1963 | Hysler et al. | |
| 4,027,231 A | 5/1977 | Lohrmann | |
| 4,563,629 A | 1/1986 | Keiper | |
| 4,617,506 A | 10/1986 | Bogie et al. | |
| 5,049,804 A | 9/1991 | Hutchings | |
| 5,113,127 A | 5/1992 | Hoffman et al. | |
| 5,157,318 A | 10/1992 | Wang | |
| 5,187,422 A | 2/1993 | Izenbaard et al. | |
| 5,311,112 A | 5/1994 | Creaco et al. | |
| 5,406,188 A | 4/1995 | Myslinski et al. | |
| 5,460,901 A * | 10/1995 | Syrjala ................ | 429/90 |
| 5,489,836 A | 2/1996 | Yuen | |
| 5,523,668 A | 6/1996 | Feldstein | |
| 5,565,756 A * | 10/1996 | Urbish et al. ........... | 320/103 |
| 5,614,807 A | 3/1997 | Duley | |
| 5,729,115 A | 3/1998 | Wakefield | |
| 5,764,032 A | 6/1998 | Moore | |
| 5,773,963 A * | 6/1998 | Blanc et al. ........... | 320/145 |
| 5,789,901 A | 8/1998 | Lomholt | |
| 5,994,874 A | 11/1999 | Hirose | |
| 6,023,150 A | 2/2000 | Patino et al. | |
| 6,163,132 A | 12/2000 | Higuchi et al. | |
| 6,184,660 B1 * | 2/2001 | Hatular ................ | 320/141 |
| 6,222,343 B1 | 4/2001 | Crisp et al. | |
| 6,304,060 B1 | 10/2001 | Dernehl | |
| 6,313,605 B1 | 11/2001 | Tsenter | |

(Continued)

OTHER PUBLICATIONS

Maxim Integrated Products, "Maxim NiCd/NiMH Battery Fast-Charge Controllers, MAX712/MAX713," Rev 5; Apr. 2002, p. 1-17 (2002).

*Primary Examiner*—Edward Tso
*Assistant Examiner*—M'Baye Diao
(74) *Attorney, Agent, or Firm*—Barnes & Thornburg LLP

(57) ABSTRACT

A battery charger having an integrated battery charge indicator that is readily visible when a battery pack is connected for charging. The battery charge indicator is on a visible outer surface of the housing of the battery charger to indicate a state of charge of the battery pack. The indicator may include a series of light emitting diodes with one LED that is illuminated when the battery pack is charging and will flash if something is wrong with the battery pack. The housing can preferably accommodate more than one configuration of battery packs with the indicator being visible when various battery packs are attached for recharging.

7 Claims, 6 Drawing Sheets

U.S. PATENT DOCUMENTS

| | | |
|---|---|---|
| 6,344,731 B2 | 2/2002 | Park |
| 6,456,035 B1 | 9/2002 | Crisp et al. |
| 6,525,511 B2 * | 2/2003 | Kubale et al. ............... 320/112 |
| 6,545,448 B1 | 4/2003 | Stanley et al. |
| 6,828,914 B2 | 12/2004 | Zur et al. |
| 7,064,519 B2 * | 6/2006 | Ito ............................ 320/112 |
| 2004/0046673 A1 | 3/2004 | Kovarik et al. |
| 2004/0135548 A1 | 7/2004 | Takano et al. |
| 2005/0017686 A1 | 1/2005 | Sakakibara et al. |
| 2005/0134224 A1 | 6/2005 | Chuang |
| 2006/0049798 A1 * | 3/2006 | Yang ......................... 320/112 |
| 2007/0103112 A1 * | 5/2007 | Casalena et al. ............ 320/112 |

* cited by examiner

BATTERY CHARGER WITH CHARGE INDICATOR

BACKGROUND

This invention relates to the field of battery chargers, and specifically to a battery charger with an integrated state of charge indicator on a visible outer surface of the battery charger.

In the power tool field, it is common to use different types of hand-held, cordless power tools to address the varied needs of the user of the power tools. It is also common to use power tools that operate on different voltages with different battery packs. The need to use different types of power tools and/or power tools of different voltages typically cause issues with battery chargers with multiple functions and recharging capabilities.

Certain power tools are powered by removable and rechargeable battery packs that require intermittent recharging. Having sufficient charge in a battery for a power tool allows a user to accomplish the task at hand. A battery pack can be attached to the power tool to provide power for operation of the tool. More than one battery pack can be used in conjunction with power tools. This allows one battery pack to charge while the other is being used. Depleted battery packs can be swapped out and recharged. Power tool users may not always be aware of the state of charge of each battery pack. Thus, a device to determine the charge state of a battery pack would be useful, particularly if in conjunction with the battery charger itself.

Although battery packs with a voltage indicator circuit are known, the chargers do not provide visible feedback to the user indicating the state of charge of multiple configurations of battery packs prior to entering the charge cycle.

U.S. Pat. No. 4,027,231, the circuitry of which is incorporated herein by reference, shows a circuit for use in a battery charger connected to multiple light emitting diodes (LEDs) to indicate the remaining useful charge of a battery.

U.S. Pat. No. 6,023,150, which is incorporated herein by reference, provides an estimate of remaining charge of a battery based on a variety of characteristics of the battery. The system also compensates for battery temperature.

U.S. Publication No. 2005/0134224 to Chuang, which is incorporated herein by reference, discloses a charger capable of displaying quantity of charge of a rechargeable battery. The charger has a display unit 16 can be a set of lights of multiple LEDs with each light distinguished by different colors or by labels allowing the user to judge how much the rechargeable battery is charged. After the rechargeable battery has finished charging, the display unit will provide multiple percentage levels for electricity quantity according to the display signal and then display the actual quantity of charge that has been charged to the rechargeable battery. The disclosure indicates that the charger can have a separate error detection light 14 that will flash to inform the user for a battery replacement or turning off the electric power.

Existing battery chargers may have a connection for a single device or provide a universal connector for individual connection to multiple types of devices. There is a need, however, for a charger that can receive multiple types of devices. In this regard, it would also be desirable to have a battery charger with an integrated state of charge indicator and fault indicator on a visible outer surface of the battery charger that can be viewed with various battery packs attached to the battery charger.

SUMMARY OF THE DISCLOSURE

The present disclosure includes an improved battery charger having an integrated battery charge indicator that is readily visible when a battery pack is connected for charging. The battery charge indicator is on a visible outer surface of the housing of the battery charger to indicate a state of charge of the battery pack.

Further regarding that feature, the indicator may include a series of light emitting diodes with one LED that is illuminated when the battery pack is charging and will flash if something is wrong with the battery pack.

A possible benefit is to have a single housing of the battery charger that can accommodate more than one configuration of battery packs wherein the indicator is visible when various battery packs are attached for recharging.

BRIEF DESCRIPTION OF DRAWINGS

The present disclosure will be described hereafter with reference to the attached drawings, which are given as a non-limiting example only, in which.

Figure 1:
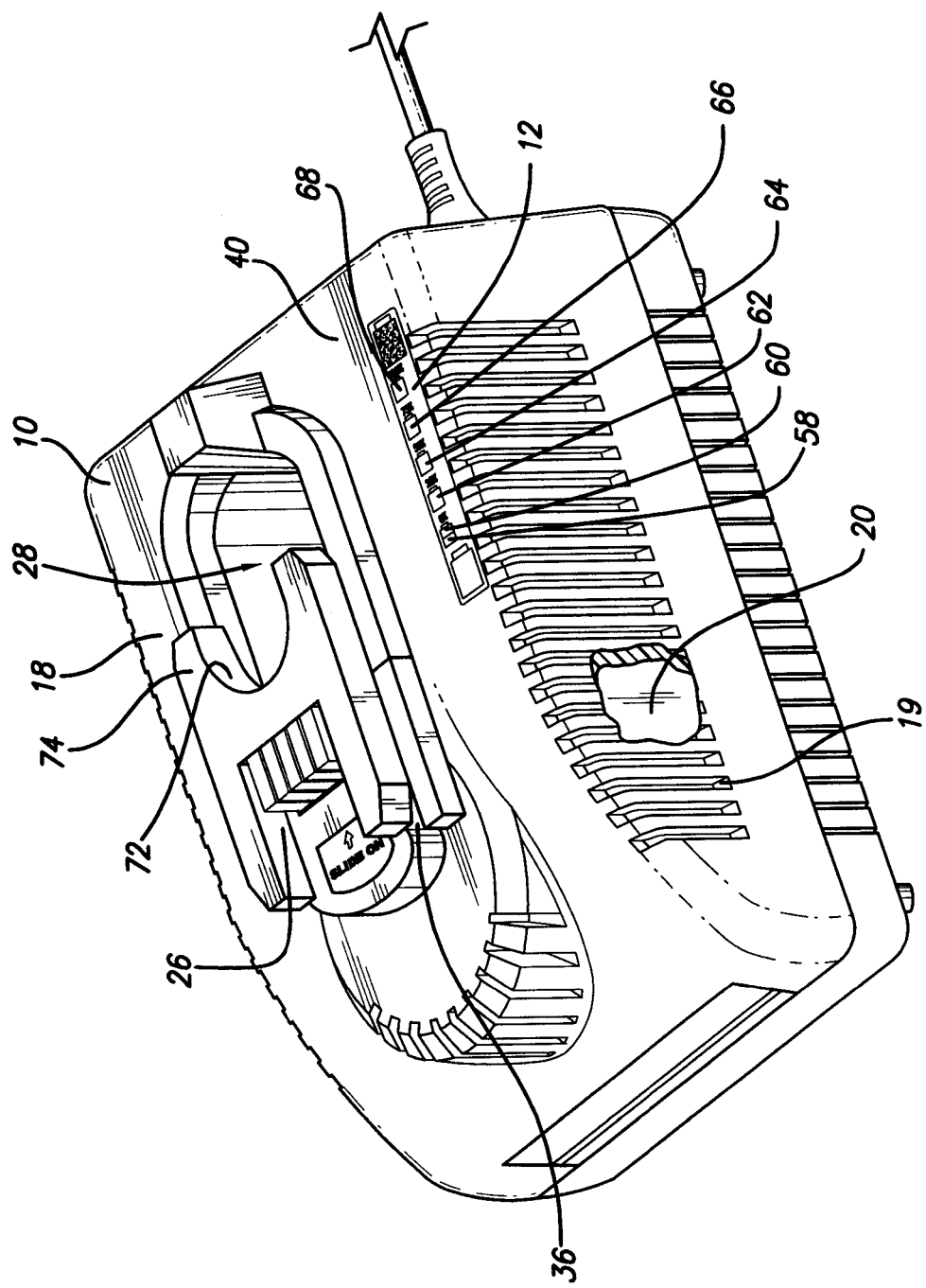
FIG. 1 is a perspective view of a battery charger.

The exemplification set out herein illustrates embodiments of the disclosure that is not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

The following disclosure relates to a battery charger 10 that includes an integrated state of charge indicator 12 for a battery pack (i.e. 14 and 16) that can be connected to the battery charger 10, such as for charging a rechargeable cell in the battery pack, 14 and 16. Each battery pack 14 and 16 is removably attachable to the battery charger 10. The battery charger 10 has a housing 18 preferably with vents 19 and an internal charge device 20 that adapts electrical current to charge a cell in the battery pack 14 and 16. The process of charging is known. Battery chargers 10 typically contain terminal assemblies (i.e. 22, 24) for establishing electrical contact with battery packs 14 and 16 to be recharged. A commercial embodiment of this disclosure has been available for less than one year from Snap-on, Inc. designated as model CTC420 (Input: 120 V AC-60 HZ, Output: 9.6-18 V DC—4.1 A). In some embodiments, the battery charger 10 may provide a variety of charging currents, such as 2.0 amps, 2.6 amps or 4.1 amps, depending on the applicable chemistry of the battery to be charged.

That battery charger 10 charges a variety of voltages, such as 9.6, 12, 14.4, 18-volt, and 20.4 volts, including post-style battery packs (i.e. 16), such as Snap-on, Inc.'s CTB3092 9.6V NiCad battery, as well as slide-on style battery packs (i.e. 14), such as Snap-on, Inc.'s recent CTB4185 Series, which can be used with CDR4850 Cordless Driver/Drill Kit. Such battery packs 14 and 16 can be used for powering cordless power tools. The disclosed battery charger 10 accepts at least both battery pack configurations (14 or 16) and both Nickel Cadmium (NiCad) and Nickel Metal Hydride (NiMH) batteries. In some cases, the battery charger 10 may charge other voltages, such as 20.4 volts.

Figure 3:
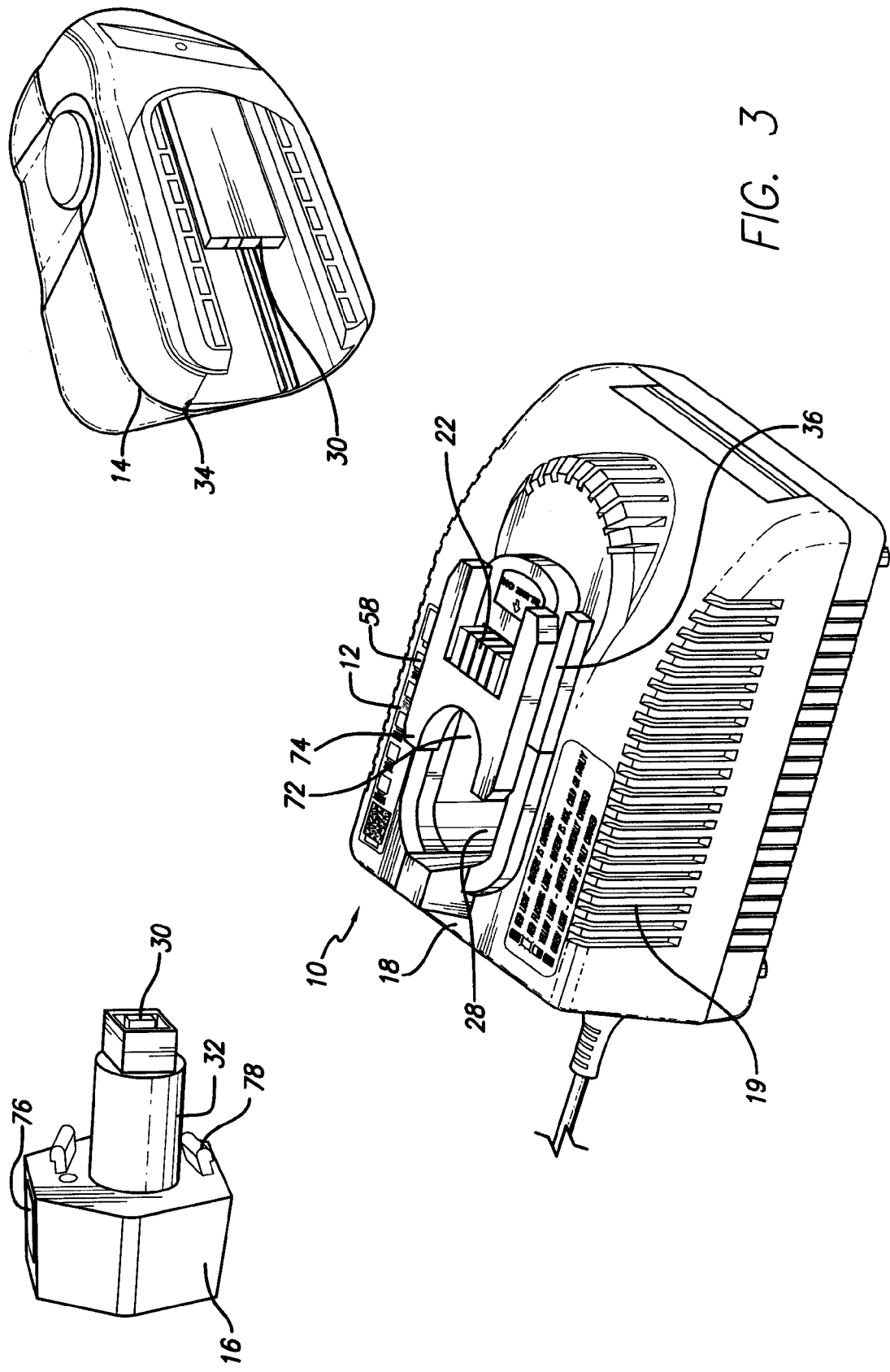
FIG. 3 is a view of a battery charger with two compatible battery packs.

Preferably, a battery charger 10 accepts more than one battery pack configuration. With reference to FIG. 3, battery packs 14 and 16 can each be attached, such as to the shoe mount 26 in a slide-on fashion, as for slide-in battery packs 14, or into the cavity 28 in a threading or telescopic fashion, such as for post-style battery packs 16. Electrical coupling of the removable battery packs 14 and 16 with the battery charger 10 can be made by pedestal connections and horizontal slide-in shoe connections.

The battery packs 14 and 16 include terminal connectors 30 (typically male) that electrically connect to battery charger 10 via terminal assemblies 22 or 24, respectively, during charging of the battery pack 14 or 16. The terminal assemblies 22 and 24 of the battery charger 10 function as electrical contacts. The battery pack terminals 30 may be electrically connected to at least one rechargeable cell in the battery pack 14 or 16.

The slide-in battery pack 14 slides into a shoe mount 26 to electrically connect to the terminal assembly 22 of the battery charger 10. The slide-in battery pack 14 has grooves 34 that can slide horizontally into corresponding recesses 36 on each side of the shoe mount 26 so that the battery pack 14 connects to the terminal assembly 22 on the battery charger 10. The shoe mount 26 includes terminal assembly 22, which preferably comprises two parallel female terminal resilient guideways that can slightly flex away from each other that function as electrical contacts and also another guideway for grounding. The grooves 34 of the slide-in battery pack 14 slide horizontally into corresponding recesses 36 in the shoe mount 26, so that the battery pack terminal 30 engages the terminal assembly 22 of the battery charger 10 in the direction of insertion. It is possible to reverse this configuration such that the female terminals are on the battery pack 14 and the blades are on the battery charger 10.

A post-style battery pack 16 can also be used with a battery charger 10. A post portion 32 projecting from the post-style battery packs 16 is adapted to be inserted into a cavity 28 in the battery charger 10. Terminal 30 has connectors (typically three male blades including ground) on the end of the post portion 32 connect the terminal assembly 24 (typically female) of battery charger 10 inside the cavity 28 (on the base) when the post portion 32 is plugged into the battery charger 10.

Figure 2:
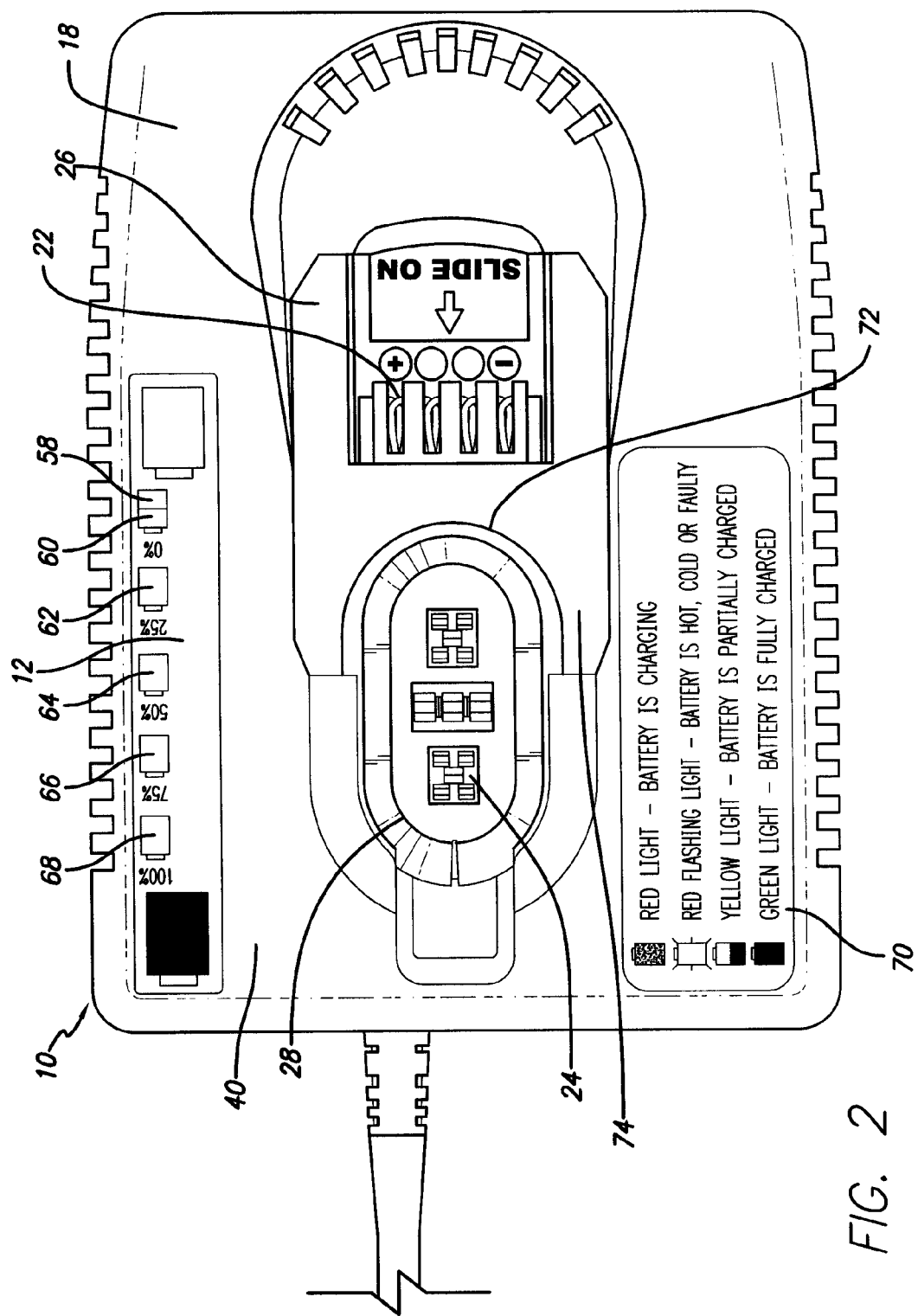
FIG. 2 is a top view of a battery charger.

With reference to FIGS. 1 and 2, the battery charger 10 has an integrated charge indicator 12 on a visible outer surface 40 of the housing 18 of the battery charger. The battery charge indicator 12 visually indicates the level of charge of the battery pack 14 or 16. The charge indicator 12 is located on a portion of the outer surface 40 that is not hindered by the various battery packs 14 or 16 when mounted for recharging.

The charge indicator 12 is a coupled with circuitry 50 that detects the amount of charge in the battery pack 14 or 16. The circuitry 50 detects the presence of a battery pack 14 or 16 and then detects the state of the charge of the battery pack 14 and 16. The state of the charge is then presented on a visual indicator 58, which could be, as examples, multiple LEDs, a seven-segment LED, or a LCD display. In the embodiment shown, multiple light emitting diodes (LEDs) 60, 62, 64, 66, 68, are coupled with the circuitry 50. For example, the circuitry 50 may be configured to turn on the appropriate number of the LEDs, i.e. 60, 62, 64, 66, 68 to indicate a current level of charge, such as the current proportion of charge compared with total capacity. The circuitry 50 is coupled with a visual display on the housing 18 of the battery charger 10 with LEDs that emit light in different combinations to indicate the level of charge of a battery pack 14 or 16. The LEDs, i.e. 60, 62, 64, 66, 68, may be illuminated or not based on the state of the charge of the battery in a battery pack 14 or 16 to provide a visual indication of the current charge state.

The battery charger 10 may be used to determine the level of charge in the battery pack 14 and 16 so that the user can determine if there is sufficient charge left to finish a job. For example, when the battery pack 14 or 16 is used on a power tool, the user can place the battery pack 14 or 16 in the battery charger 10 to determine the charge level. Additionally, the user can place a battery pack 14 or 16 for charging and then monitor when the charge level reaches 100%, rather than estimate the time for charging. After knowing the battery is fully charged, the user can then remove the charged battery pack 14 or 16 for storage or use. This device and method will eliminate the need for the user to guess as to the status of a battery pack 14 or 16 that is charging. Additionally, the levels (i.e. from 0% to 100%) may indicate to the user the proportion of charge.

For example, five LEDs 60, 62, 64, 66, 68 could be used to show the percent of charge of a connected battery pack 14 or 16, such as with a single red light 60 for low charge state, three yellow lights (62, 64, 66) for 25%, 50%, and 75% respectively, and a green LED 68 that can illuminate to show 100% of charge for a fully charged battery. One or more LEDs (60, 62, 64, 66, and/or 68) illuminates to indicate the level of charge of the battery pack 14 or 16 connected to the battery charger 10. The illuminated red light or single LED (i.e. 60) indicates that the battery is charging. If yellow lights (i.e. 62, 64 or 66) are illuminated, the battery is partially charged. It should be readily apparent that more or less branches can be used in the circuitry to vary the number of LEDs with the understanding that illumination of all LEDs indicates that battery pack 14 or 16 is fully charged, such was with the preferred green LED 68.

The first light emitting diode 60 provides a visual indication that the battery pack 14 or 16 is charging when the first LED 60 is illuminated, but the first LED 60 will flash if there is something wrong with the battery pack 14 or 16.

As such, the visual indicator 58 has a special fault indicator. The LED 60 for the first level, low charge, or 0% may have a different colored light, such as red, which is connected to the circuitry 50 in a manner such that it will flash if there is something wrong with the battery pack 14 or 16. For example, if the battery pack 14 or 16 is faulty or incapable of being properly charged, the first level LED 60 will flash. Additionally, the first level LED 60 can function as a special temperature indicator. If the battery pack 14 or 16 is too hot or too cold to charge, the circuitry 50 can detect this condition and once again provide a flashing indicator. As such, a red flashing light (i.e. from LED 60) can indicate that the battery is hot, cold or faulty. If a battery pack 14 or 16 is placed in the battery charger 10 for charging, a flashing red light will signal if the battery is either too hot or too cold or the flashing red light could mean that the battery is faulty or the chemicals are exhausted. For example, the flashing frequency of the red light could indicate different conditions. By way of example only, if the light flashed at 1 Hz, this could indicate a hot or cold battery, but flashing at 3 Hz could indicate that the battery is faulty or the chemicals are exhausted. If the temperature is acceptable, this visual indicator 58 provides feedback to the user to allow them to know when a battery has expired since batteries have a finite life limited to a certain number of charges.

A label 70 on the housing 18 can indicate the meaning of the LEDs, such as (1) Green Light—battery is fully charged; (2) Yellow Light—battery is partially charged; (3) Red Flashing Light—Battery is hot, cold or faulty; and (4) Red Constant Light (i.e., not flashing)—battery is charging.

The shoe mount 26 may have a cambered alcove 72 that forms part of the cavity 28. Thus, the cambered alcove 72 has an arch 74 that allows for recesses 36 on each side of the shoe mount 26 to extend farther, such as adjacent a part of the cavity 28, while allowing the cavity 28 to be compact and close to the shoe mount 26. The arch 74 preferably does not extend completely around the perimeter of the cavity 28.

It is undesirable to insert a battery pack 14 or 16 into a battery charger 10 with the polarity reversed, which may cause short circuiting. Certain post-style battery packs (i.e. 16), such as Snap-on, Inc.'s CTB3092 battery, have a button 76 that moves a tab 78 extending adjacent the post portion 32, preferably on each side of the post-style battery pack 16 to assist with attaching the battery pack 16 to a tool. This particular embodiment has a symmetrical post portion 32. If such post-style battery packs 16 are properly inserted into the cavity 28, the tab 78 of the battery pack 16 will not contact the arch 74. If such post-style battery packs 16 are inserted backwards into the cavity 28, the tab 78 will contact the arch 74, and the post portion 32 of post-style battery pack 16 cannot be fully inserted into the cavity 28, after which the user should notice that the battery pack 16 was inserted backwards. Similarly, it should be apparent that slide-in battery packs 14 can only insert and connect in one way to the terminal assembly 22 on the battery charger 10. The grooves 34 of slide-in battery pack 14 can only slide horizontally into corresponding recesses 36 on each side of the shoe mount 26 for the battery pack 14 to connect to the terminal assembly 22 on the battery charger 10.

Figure 4A:
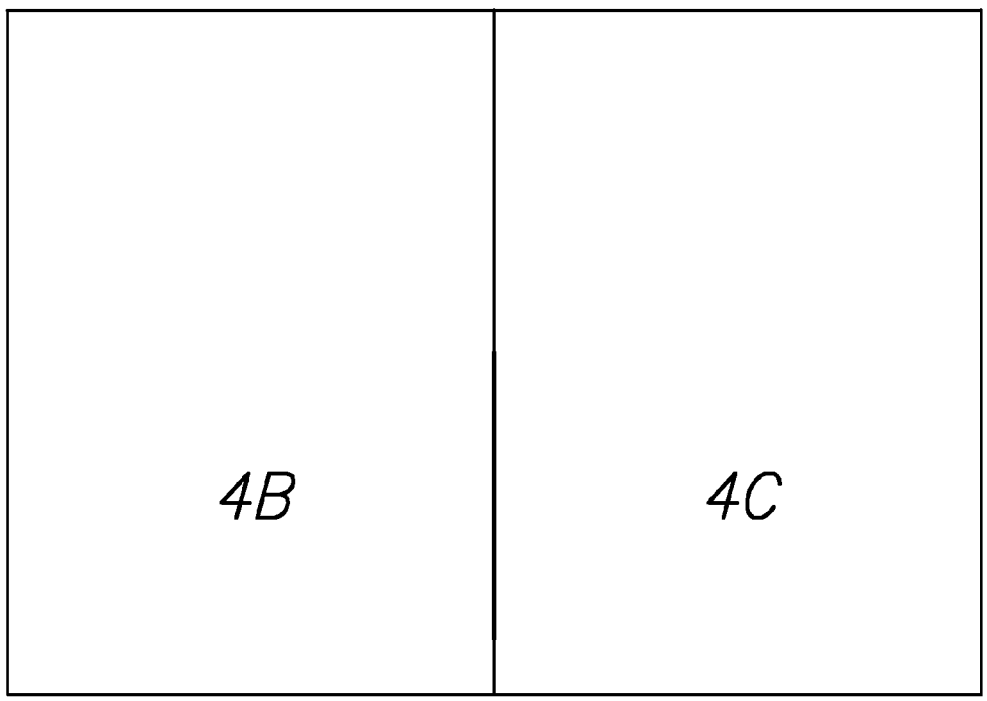
FIG. 4 is a diagram to illustrate the relationship of FIG. 4B and FIG. 4C, which show example circuitry that may be used.
Figure 4B:
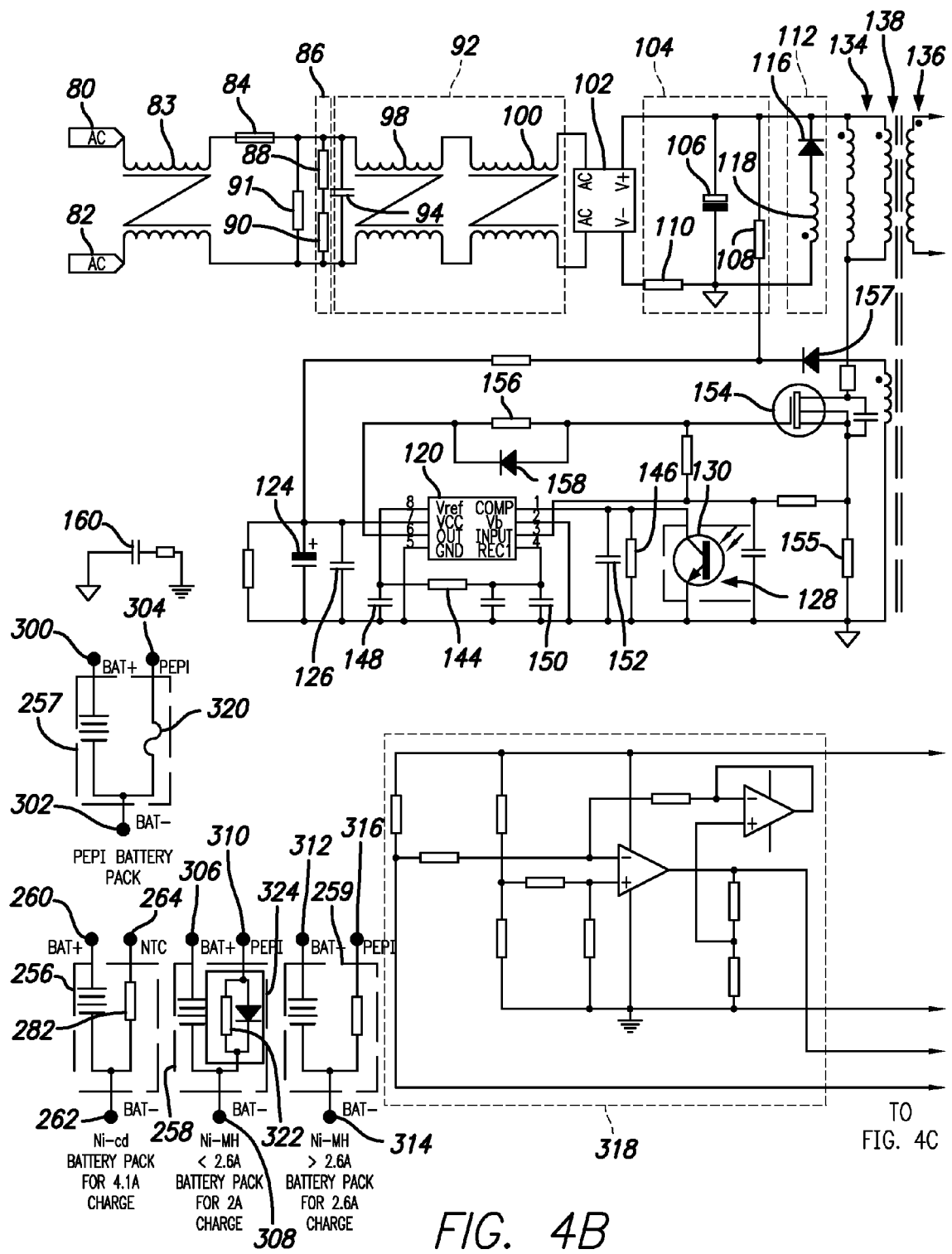
Figure 4C:
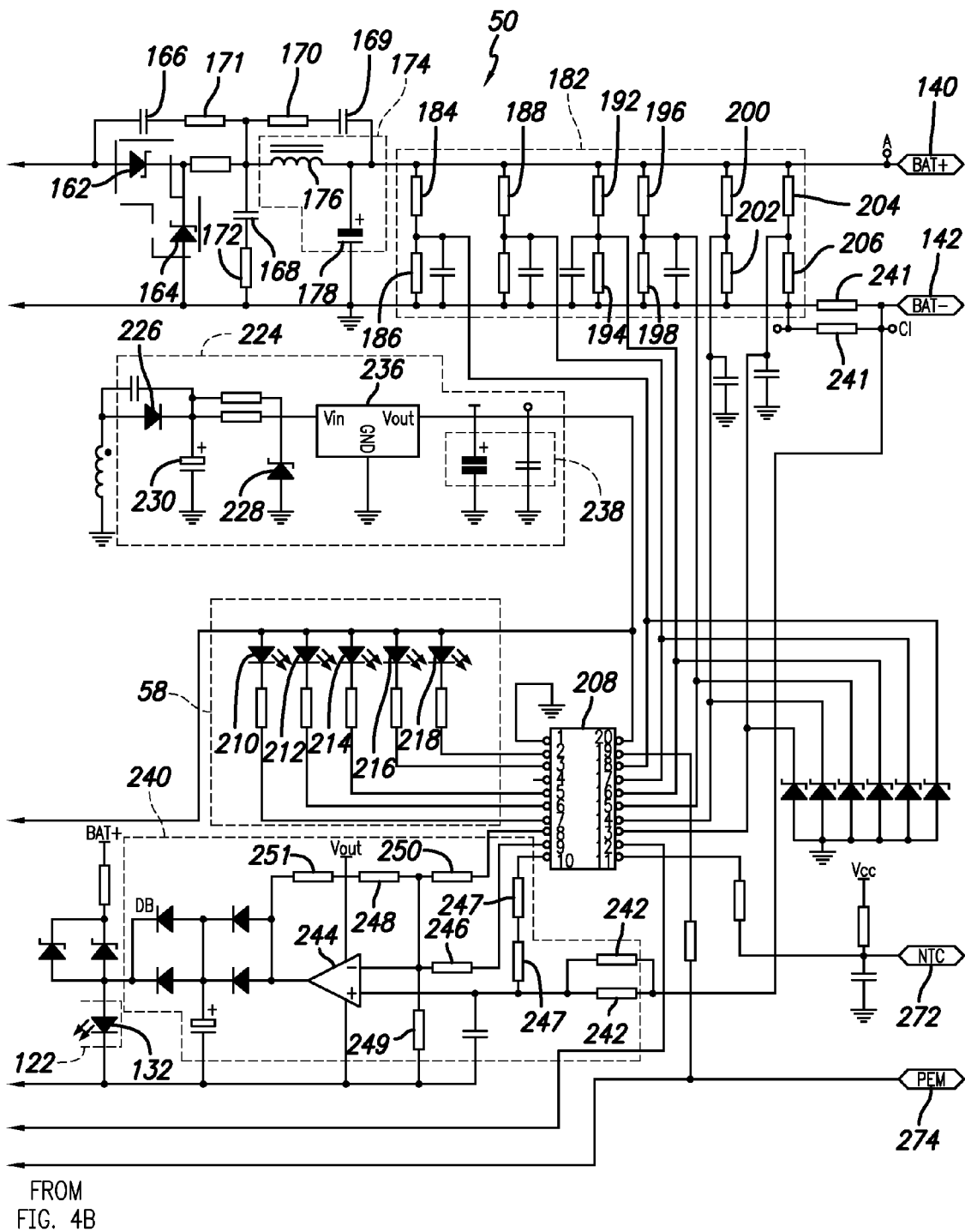

FIG. 4A is a diagram to illustrate the relationship of FIG. 4B and FIG. 4C, which show example circuitry 50 that is capable of implementing the functionality described herein. It should be appreciated that the functionality could be implemented in many different forms other than the example shown in FIGS. 4B and 4C. The terms "circuitry" and "circuit" are broadly intended to include hardware, software and other functional equivalents. Herein, the phrase "coupled with" means directly connected to or indirectly connected through one or more intermediate components. Such intermediate components may include both hardware and software based components.

In the example shown, the circuitry 50 includes a positive input terminal 80 and a negative input terminal 82 which may be coupled with an alternating current ("AC") source, such as a wall outlet. The terminals 80 and 82 are coupled with an inductor 83 in this example for purposes of suppressing high frequency components in the input signal. The inductor 83 is coupled with a temperature sensitive element 84. In the example shown, the temperature sensitive element 84 is a negative temperature coefficient ("NTC") resistor whose electrical resistance decreases as the temperature of the resistor increases. The temperature sensitive element 84 prevents the occurrence of a spark when the terminals 80 and 82 are initially coupled with an AC source.

In the embodiment shown, the temperature sensitive element 84 is coupled with a bleeder resistance element 86 and a decoupling element 92. The bleeder resistance element 86 discharges stored energy in the decoupling element 92 after a user disconnects the AC source from the input terminals 80 and 82. Typically, the resistance is chosen to reduce the voltage to a low level within a specified period of time (time constant). By way of example only, the bleeder resistance element 86 may provide 300 k ohms of resistance in one embodiment. This is a safety measure to prevent shock if a user touches the input terminals 80 and 82 immediately after the AC source is disconnected (prior to the discharge of energy storage elements in the decoupling element 92, such as capacitors and inductors). In the example shown, the bleeder resistance element 86 comprises resistors 88, 90 and 91, which are connected in series. It should be appreciated, however, that a single resistor or more than two resistors (whether in series or in parallel) or more could provide the desired resistance for the bleeder resistance element 86. It should be appreciated that the bleeder resistance element 86 is selected to withstand the input level.

The decoupling element 92 is configured to provide surge protection and filter out high frequency components. By way of example, the decoupling element 92 may be a filter arrangement configured to attenuate frequencies over 150 kHz. This reduces radiated interference with other electronics, such as radios. In the example shown, the decoupling element 92 is a filter comprising capacitors 94 and 96 and inductors 98 and 100. It should be appreciated that other filter arrangements could be used to suppress high frequency components.

The decoupling element 92 is coupled with a rectifier arrangement 102 that converts the AC input into a direct current ("DC") output. In the example shown, the rectifier arrangement 102 is a bridge diode in the form of an integrated circuit ("IC"). By way of example only, the rectifier arrangement 102 may be a full wave bridge rectifier. It should be appreciated, however, that other elements could convert the AC input into a DC output, such as four individual diodes arranged in a bridge circuit (also known as a Graetz bridge).

In the example shown, the rectifier arrangement 102 is coupled with a smoothing circuit 104 that smooths the DC level from the rectifier arrangement 102. In this example, the smoothing circuit 104 comprises a capacitor 106, a resistor 108 and a resistor 110. The smoothing circuit 104 is coupled with a snubber circuit 112, which limits the voltage level of back EMF generated from the transformer 138. In this example, the snubber circuit 112 comprises a diode 116 and an inductor 118 to provide some delay in response time, reducing interference.

In the embodiment shown, a pulse width modulator 120 ("PWM") controls the charging current provided to a battery pack. Preferably, the PWM 120 is a current mode PWM, which is configured to adjust the charging current by controlling a switching element 154. A resistor 156 and diode 158 may be provided to aid in speeding up the off time for a switching element 154. The capacitors 124 and 126 may be provided for a stable voltage supply to the PWM 120. The PWM 120 may be controlled by an isolated photocoupler 128, which comprises a phototransistor 130 and a LED 132 in this example. Rather than a physical connection, light radiated by the LED 132 may be used to turn on/off the phototransistor 130. The photocoupler 128 provides separation in the circuit between the primary winding 134 and the secondary winding 136 of the transformer 138. This is a safety mechanism to prevent the possibility of shock from the AC source if a user touched the output terminals 140 and 142 (when a battery is not coupled with the terminals 140 and 142).

The PWM 120 generates a time varying signal, such as a square wave, that has a variable duty cycle depending on whether the phototransistor 130 is on. When the phototransistor is on, the output waveform generated by the PWM 120 has the maximum duty cycle (which may vary depending on the type of battery pack to be charged); conversely, when the phototransistor 130 is off, the PWM 120 generates an output waveform with a minimum duty cycle. Resistor 144, along with capacitors 148, 150, help select the duty cycle of the output waveform generated by the PWM 120. By way of example only, the maximum duty cycle may be about 13% for a 9.6 V battery pack while the maximum duty cycle may be about 23% for an 18 V battery pack. Typically, the minimum duty cycle is about 5%.

In this example, the switching element 154 is an n-channel MOSFET transistor with its gate, source, and drain coupled with the output of the PMW 120, upper primary coil 134 of the transformer 138, and ground through a resistor 155, respectively. The switching element 154 may be used to selectively supply power to the upper secondary coil 136 of the transformer 138. When the switching element 154 is on, the upper primary coil 134 supplies voltage to the upper secondary coil 136, thereby providing charging current to output terminals 140 and 142; if the switching element 154 is off, the upper primary coil 134 of the transformer 138 does not supply charging current. The duty cycle of the output signal generated by the PWM 120 can be used to set the current level supplied to the battery being charged.

In some cases, a capacitor 160 may be coupled between the primary coil 134 and the secondary coil 136 of the transformer 138 for purposes of filtering. The transformer 138 steps down the voltage on the primary coil 134 to a desired supply voltage on the secondary coil 136.

In the embodiment shown, the transformer's 138 upper secondary coil 136 is coupled with a pair of rectifiers 162 and 164 that serve as further rectification of the input provided to the secondary coil 136. In some cases, the rectifiers 162 and 164 may be fast-switching diodes. In the example shown, capacitors 166, 168 and 169 and resistors 170, 171 and 172 provide high frequency suppression. In some cases, the high frequency suppression may be fitted over the leads of the rectifiers 162 and 164. The rectifiers 162 and 164 are coupled with a smoothing circuit 174 that smoothes ripples from the rectification. In this example, the smoothing circuit 174 includes an inductor 176 and capacitor 178.

The smoothing circuit 174 is coupled with a voltage divider network 182. In this example, the voltage divider network 182 includes a first resistor pair 184 and 186, a second resistor pair 188 and 190, a third resistor pair 192 and 194, a fourth resistor pair 196 and 198, a fifth resistor pair 200 and 202, and a sixth resistor pair 204 and 206. In this example, the resistor pairs are connected in parallel to output terminals 140 and 142. A node between each resistor pair may be coupled with an analog to digital converter ("ADC") portion of a controller 208. By way of example, the controller 208 may be a microcontroller sold under the name S3F9454 by Samsung Electronics. It should be appreciated that a separate ADC could be used, rather than an onboard ADC.

The ADC portion of the controller 208 is adapted to perform an analog to digital ("A/D") conversion of the input voltage supplied to the respective pins that are coupled to the voltage divider network 182. When a battery is connected to output terminals 140 and 142, the controller 208 can determine the voltage level of the battery based on the voltage supplied by the voltage divider network 182 to the controller 208. For example, the controller 208 may include memory with a lookup table to determine the voltage level of the battery based on the respective voltages provided by the voltage divider network 182. Typically, the controller 208 would continue to periodically determine the voltage level of the battery based on the voltage supplied by the voltage divider network 182. The controller 208 may also determine the type of battery coupled with the output terminals 140 and 142 based on the lookup table stored in memory. For example, the controller 208 may determine whether a 9.6 volt or a 14.4 volt battery is connected to the output terminals 140 and 142 based on the respective voltage levels supplied by the voltage divider network 182.

Based on the voltage levels the controller 208 detects across the voltage divider network 182, the controller 208 outputs a signal to the visual indicator 58 indicative of a charge level in the battery. The visual indicator 58 could be, as examples, a seven-segment LED display, a LCD display, a needle indicator or other types of visual indicators.

In the example shown, the visual indicator 58 comprises a first LED 210, a second LED 212, a third LED 214, a fourth LED 216, and a fifth LED 218. Although five LEDs are shown in this example, more or less LEDs may be provided. In some cases, the controller 208 may turn on a selective number of the LEDs 210, 212, 214, 216, and 218 to indicate the charge level of the battery as a percentage based on the voltage level of the charging curve. Consider, for example, a 14.4 battery with an initial voltage level of 1.3 volts that is coupled with the output terminals 140 and 142. In this example, the controller 208 may light up the first LED 210 as soon as the battery is coupled with the output terminals 140 and 142. This may indicate to the user that the battery is charging. Since the battery voltage is less than a predetermined percentage (e.g., 10%) of the battery's voltage level, no other LED may be lit. Once the voltage of the battery is charged sufficiently to reach a level above a first predetermined level, such as 20% of the battery's voltage capacity (or above 2.88 volts in this example), the controller 208 may light up the second LED 212. As the battery continues to charge and has a voltage level above another predetermined percentage, such as 40% of the battery's voltage capacity (or above 5.76 volts in this example), the controller 208 may light up the third LED 214. Likewise as the battery continues charging the controller 208 may sequentially light up the fourth LED 216 (e.g., when the battery's voltage level exceeds 60% of the voltage capacity), the fifth LED 218 (e.g., when the battery's voltage level exceeds 80% of the voltage capacity) and then the sixth LED 220 upon a complete charge. In this manner, the user will be able to detect the battery's approximate voltage level upon initial coupling to the output terminals 140 and 142, as well as during the charge cycle. In some cases, the LEDs could remain on, once lit, during the charging process. In the above example, both the first LED 210 and the second LED 212 could be on when the battery reaches a level above the first level (e.g., 20%). When the battery reaches the next predetermined level (e.g., 40%), the first LED 210, second LED 212 and third LED 214 could all be on. As mentioned above, the visual indicator 58 could numerically indicate the battery's approximate voltage level. If the visual indicator 58 were two seven-segment LEDs, for example, the controller may drive the LEDs to indicate a numerical value indicative of the percent charged. Consider a 9.6 volt battery, for example, the LEDs may indicate "21" when the battery's voltage level is approximately 2.0 volts.

In the embodiment shown, the lower portion of the secondary winding is coupled with a regulated voltage supply 224 that provides a substantially constant DC voltage source for the controller's 208 power supply input. As shown, the regulated voltage supply 224 includes diodes 226 and 228 to rectify the incoming signal to ensure a DC voltage source. The diodes 226 and 228 are coupled with a smoothing circuit 230 to smooth rippling in the signal. In this example the smoothing circuit 230 comprises a capacitor. The smoothing circuit 230 is coupled with a voltage regulator 236, which is coupled with a final smoothing circuit 238. By way of example only, the voltage regulator sold under the name LM78L05 by National Semiconductor of Santa Clara, Calif. could be used.

In the example shown, the negative output terminal 142 is coupled as an input to a current regulation circuit 240. The current regulation circuit 240 detects the presence of a battery coupled with the output terminals 140 and 142 and turns on the LED 132 portion of the optocoupler 128, thereby turning on the phototransistor 130 and supplying charging current to the battery. In the example shown, the negative output terminal 142 is coupled with sensing resistors 241 that are in series with resistors 242, which are coupled with the non-inverting input of an operational amplifier 244 ("opamp"). The controller 208 provides a reference voltage signal to the inverting input of the opamp 244 through a resistor 246. The voltage level of the reference voltage may be used to set the desired charging current. In the example shown, resistors 248 and 249 set the bias voltage for the inverting input of the opamp 244, which is typically a fixed input. As shown, resistors 242 and 247 set the bias of the opamp's 244 non-inverting input, which is typically a variable input. As discussed below, the reference voltage may be selected by the controller 208 based on the type of battery detected (and the desired charging current associated with the detected battery).

In the example shown, the current regulation circuit 240 creates a weak positive feedback loop through the resistor 251 between the opamp's 244 output and the non-inverting input. When the output makes a transition, the positive feedback slightly changes the positive input so as to reinforce the output change. Based on the level detected at the output of the opamp 244, the controller 208 sends a signal to the LED 132 through a resistor 252 and a diode 254. As discussed above, by turning on the optocoupler 128, the circuitry 50 supplies a charging current to the battery. The signal to the LED 132 could be varied to adjust to different charging currents of various batteries. For example, the controller 208 may be configured to generate a first signal if the desired charging current for the battery were 4.1 amps for a NiCad battery, for example; however, the controller 208 could generate a second signal to provide a 2.0 amp charge current for a NiMH battery. The controller 208 initiates a timer when a battery pack is coupled with the output terminals 140 and 142. In such a case, the controller may turn off charging as a backup should the primary cut-off voltage or temperature not be detected.

Four example battery packs are shown in FIG. 4B: a first NiCad battery pack 256, a second NiCad battery pack 257, a first NiMH battery pack 258, and a second NiMH battery pack 259. As shown, the first NiCad battery pack 256 includes a positive terminal 260, a negative terminal 262 and a battery detection terminal 264. The example NiMH battery pack 258 that is shown includes a positive terminal 206, a negative terminal 308 and a battery detection terminal 310. In this example, the second NiCad battery pack 259 includes a positive terminal 312, a negative terminal 314 and a battery detection terminal 316. In some cases, the battery packs 256, 257, 258 and 259 may include a fourth terminal (not shown) that may be coupled with an open terminal.

When the first NiCad battery pack 256 is coupled with the battery charger 10, in the embodiment shown, the positive terminal 260 will be coupled with the positive output terminal 140, the negative terminal 262 will be coupled with the negative output terminal 142, and the battery detection terminal 264 will be coupled with a first battery detection input 272 of the controller 208. With this example, the voltage detected by the controller 208 on the battery detection input 272 will be the voltage across a NTC resistor 282. As the NTC resistor 282 warms up when the first NiCad battery pack 256 is coupled with the battery charger 10, the resistance of the NTC resistor 282 will drop, such as from nominal 10 k Ohms at 25° C. approximately reduces to 3K ohms at 40 Deg C.), such that the voltage across the NTC resistor 282 will be approximately zero. The NTC resistor 282 also allows the controller 208 to detect hot and cold conditions of the first NiCad battery pack 256.

When the second NiCad battery pack 257 is coupled with the battery charger 10, in the embodiment shown, the positive terminal 300 will be coupled with the positive output terminal 140, the negative terminal 302 will be coupled with the negative output terminal 142, and the battery detection terminal 304 will be coupled with the second battery detection input 274 of the controller 208. In this example, the second battery detection terminal 304 is coupled with both the controller 208 and a high temperature detection circuit 318. In this example, the high temperature detection circuit 318 detects when a thermistor 320 (coupled between the battery detection terminal 304 and the negative terminal 302) opens due to an increase in internal temperature of the second NiCad battery pack 257. The voltage level output of the high temperature detection circuit 318 changes responsive to an opening of the thermistor 320, which causes the controller 208 to turn off charging current (or change to trickle charge).

When the first NiMH battery pack 258 is coupled with the battery charger 10, in the embodiment shown, the positive terminal 306 will be coupled with the positive output terminal 140, the negative terminal 308 will be coupled with the negative output terminal 142, and the battery detection terminal 310 will be coupled with the second battery detection input 274. In this example, the first NiMH battery pack 258 includes a NTC resistor 322 in parallel with a diode 324. As discussed in application Ser. NO. 11/625,733 concurrently filed herewith, the controller 208 may differentiate between battery chemistries. The description of this application is hereby incorporated by reference. For example, the number of diodes (zero, one, or more diodes) may be used to create a predetermined voltage drop recognizable by the controller 208, which allows the controller to differentiate between various battery types. The NTC resistor 322 allows the controller 208 to detect hot and cold conditions of the first NiMH battery pack 258. Although the first NiMH battery pack 258 is coupled with the second battery detection input 274 in this example, the first NiMH battery pack 258 may be coupled with the first battery detection input 272 since the output of the high temperature detection circuit 318 is not used in conjunction with the first NiMH battery pack 258.

When the second NiMH battery pack 259 is coupled with the battery charger 10, in the embodiment shown, the positive terminal 312 will be coupled with the positive output terminal 140, the negative terminal 314 will be coupled with the negative output terminal 142, and the battery detection terminal 316 will be coupled with the second battery detection input 274. In this example, the second NiMH battery pack 258 includes a NTC resistor 326. As discussed above, the controller 208 may differentiate between battery chemistries to set the appropriate charging current. The NTC resistor 326 allows the controller 208 to detect hot and cold conditions of the second NiMH battery pack 259. Although the second NiMH battery pack 259 is coupled with the second battery detection input 274 in this example, the second NiMH battery pack 259 may be coupled with the first battery detection input 272 since the output of the high temperature detection circuit 318 is not used in conjunction with the second NiMH battery pack 259.

The operation of the example circuitry 50 will now be discussed. Typically, the user will initially couple the input terminals 80 and 82 with an AC power source prior to coupling a battery with the output terminals 140 and 142. In such a case, a DC voltage level will be supplied to the snubber circuit 112 and the power supply input to the PWM 120. Since a battery has not been coupled with the output terminals 140 and 142, however, the optocoupler is off, which also means that the switching element 154 is off. Accordingly, voltage is not supplied to the secondary coil 136 of the transformer 138. A diode 157 may be used to develop from the bias winding of the transformer 138 the rectified voltage VCC for the PWM 120.

When a battery pack is coupled with the charger 10, the controller 208 detects the battery chemistry based on the voltage level detected at the first battery detection input 272 or second battery detection input 274. The controller 208 determines the appropriate reference voltage level based on a lookup table in memory. The reference voltage level is inputted to the current regulation circuit 240, along with the voltage on the negative output terminal 142. The current regulation circuit 240 turns on the LED 132, which turns on the phototransistor 130. When the phototransistor 130 is on, the PWM 120 outputs a waveform that turns the switching element 154 on and off, which supplies voltage to the secondary coil 136 of the transformer 138. This turns on the controller 208 through the regulated voltage supply 224 and charges the battery through the voltage divider network 182.

The voltage divider network 182 provides several voltage levels as an input to an A/D portion of the controller 208. Based on these voltage levels, the controller 208 can determine the approximate voltage level of the battery. Generally, the voltage capacity of the battery may be determined based on the voltage level detected by the controller 208. Accordingly, the controller 208 turns on the appropriate number of LEDS 210, 212, 214, 216, and 218, based on the detected voltage level and voltage capacity. As the battery continues charging, the controller turns on an increasing number of LEDs 210, 212, 214, 216, and 218 until all the LEDs may be on to indicate a full charge.

The controller 208 may shut off battery charging (by turning off the LED 132) based on a number of possible factors. For example, the controller may turn off the LED 132 based on the voltage level provided by the voltage divider network 182. By way of another example, the controller 208 may start a timer when a battery is coupled with the output terminals 140 and 142. In this example, the controller 208 may turn off the LED 132 after a predetermined amount of time. In some cases, the amount of time may correspond to a detected type of battery and/or battery capacity. By way of a further example, the controller 208 may detect when the battery exceeds or decreases below a predetermined temperature.

While this disclosure has been described as having an exemplary embodiment, this application is intended to cover any variations, uses, or adaptations using its general principles. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

The invention claimed is:

1. A battery pack charger comprising:
    a housing including a shoe for receiving a slide on battery pack configurations and a cavity for receiving blade battery pack configurations;
    a voltage divider network configured to be coupled with a battery pack engaged with at least one of the shoe and cavity;
    a controller coupled with the voltage divider network and operable to detect multiple voltage levels in the voltage divider network,
    wherein the controller is operable to detect a voltage level and voltage capacity of the battery pack based on the voltage divider network;
    a charging circuit configured to provide a charging current to a battery pack, wherein the charging circuit is coupled with the controller;
    a visual display coupled with the controller, the visual display indicating multiple levels of the state of charge of a battery pack attached thereto;
    wherein the controller controls a charging current with which the charging circuit charges the battery pack; and
    wherein the controller drives the visual display with a signal indicative of one of multiple levels as a percentage level of battery charge level.

2. The battery pack charger of claim 1,
    wherein the controller is operable to store correlation data indicative of a battery charge level correlating to voltage levels detected in the voltage divider network and
    wherein the controller is operable to determine a charge level of the battery pack by looking up a battery charge level in the correlation data corresponding to voltage levels detected in the voltage divider network.

3. The battery pack charger of claim 1,
    wherein the controller is configured to determine a type of battery pack by detecting a voltage drop across terminals of the battery pack.

4. The battery pack charger of claim 3,
    wherein the controller adjusts the charging current with which the charging circuit charges the battery pack based on the detected type of battery pack.

5. The battery pack charger of claim 4, further comprising the battery pack including a positive terminal,
    a negative terminal and
    a battery pack detection terminal,
    wherein the positive terminal and the negative terminal are configured to be coupled with the charging circuit,
    wherein the battery pack detection terminal is configured to be coupled with the controller,
    wherein the controller determines the type of battery pack based on a voltage level on the battery pack detection terminal.

6. The battery pack charger of claim 5, wherein the battery pack includes a battery portion coupled between the positive terminal and the negative terminal and a NTC resistor coupled between the battery pack detection terminal and the negative terminal.

7. The battery pack charger of claim 6, further comprising at least one diode coupled in parallel with the NTC resistor.

* * * * *